United States Patent
Weng Huang et al.

(10) Patent No.: US 12,200,163 B2
(45) Date of Patent: Jan. 14, 2025

(54) ELECTRONIC DEVICE WITH DYNAMIC WALLPAPER

(71) Applicant: ASUSTeK COMPUTER INC., Taipei (TW)

(72) Inventors: Tzu-Chuan Weng Huang, Taipei (TW); Ya-Wen Mei, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 161 days.

(21) Appl. No.: 17/686,431

(22) Filed: Mar. 4, 2022

(65) Prior Publication Data
US 2023/0231944 A1 Jul. 20, 2023

(30) Foreign Application Priority Data
Jan. 18, 2022 (TW) .................................. 111101996

(51) Int. Cl.
*G06F 9/451* (2018.01)
*H04M 1/72427* (2021.01)

(52) U.S. Cl.
CPC ........ *H04M 1/72427* (2021.01); *G06F 9/451* (2018.02)

(58) Field of Classification Search
None
See application file for complete search history.

(56) References Cited

U.S. PATENT DOCUMENTS

| 2009/0259968 A1* | 10/2009 | Hsieh | G06F 21/31 715/863 |
| 2013/0069962 A1* | 3/2013 | Nealer | H04M 1/72427 345/522 |
| 2014/0379341 A1* | 12/2014 | Seo | G06F 1/163 704/246 |
| 2015/0033160 A1 | 1/2015 | Xie et al. | |
| 2015/0334219 A1* | 11/2015 | Soundararajan | H04M 1/67 455/414.1 |
| 2020/0089302 A1* | 3/2020 | Kim | G06F 1/3265 |

FOREIGN PATENT DOCUMENTS

| CN | 102156535 | 8/2011 |
| CN | 103927175 | 7/2014 |
| CN | 103399688 | 3/2017 |
| CN | 109117103 | 1/2019 |
| CN | 111209065 | 5/2020 |

OTHER PUBLICATIONS

Account: WEIXIN_39957312, "10 Lock screen slide show_Follow me on mobile phones Lesson 188—How to set lock screen", Posted at Dec. 24, 2020, submit with English translation, pp. 1-26. Available at: https://blog.csdn.net/weixin_39957312/article/details/111699556.
Qingdou Software Park, "How to set the wallpaper of Xiaomi mobile phone to change automatically, how to open the wallpaper carousel", Dec. 7, 2020, submit with English translation, pp. 1-7. Available at: http://www.qddown.com/zixun/75502.html.

* cited by examiner

*Primary Examiner* — Tize Ma
(74) *Attorney, Agent, or Firm* — JCIPRNET

(57) ABSTRACT

An electronic device with a dynamic wallpaper is provided. The electronic device includes a touch screen and a processor. The processor is coupled to the touch screen. The processor displays a first dynamic wallpaper mode by the touch screen when determining that the electronic device is in a non-lock screen mode.

19 Claims, 10 Drawing Sheets

ELECTRONIC DEVICE WITH DYNAMIC WALLPAPER

CROSS-REFERENCE TO RELATED APPLICATION

This application claims the priority benefit of Taiwan application serial No. 111101996, filed on Jan. 18, 2022. The entirety of the above-mentioned patent application is hereby incorporated by reference herein and made a part of the specification.

BACKGROUND OF THE INVENTION

Field of the Invention

The disclosure relates to an electronic device with a dynamic wallpaper.

Description of the Related Art

To meet users' requirements of playing video games on mobile phones, mobile phones for e-sports with game players as main customers have emerged on the market. With powerful computing performance, the mobile phones for e-sports provide users with optimal gaming experience. However, high computing performance may lead to high power consumption of the mobile phone, resulting in a shorter standby time. Therefore, the mobile phone for e-sports generally includes two modes. One mode is a high-performance state with higher consumption of computing resources, and the other mode is a non-high-performance state that can reduce the consumption of computing resources.

BRIEF SUMMARY OF THE INVENTION

According to an aspect of the disclosure, an electronic device is provided. The electronic device includes a touch screen and a processor. The processor is coupled to the touch screen. The processor displays a first dynamic wallpaper mode by the touch screen when determining that the electronic device is in a lock screen mode.

Based on the above, the electronic device of the disclosure determines a dynamic wallpaper mode according to the lock screen mode or a performance state, to enhance the sense of immersion of a user when the performance is improved.

DETAILED DESCRIPTION OF THE EMBODIMENTS

Figure 1:
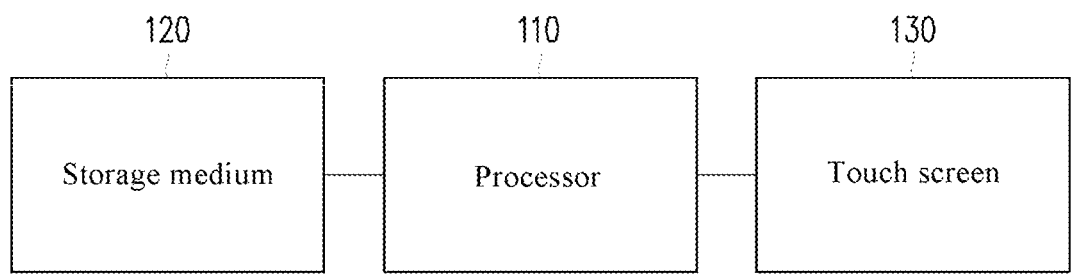
FIG. 1 is a schematic diagram of an electronic device according to an embodiment of the disclosure.
Figure 2:
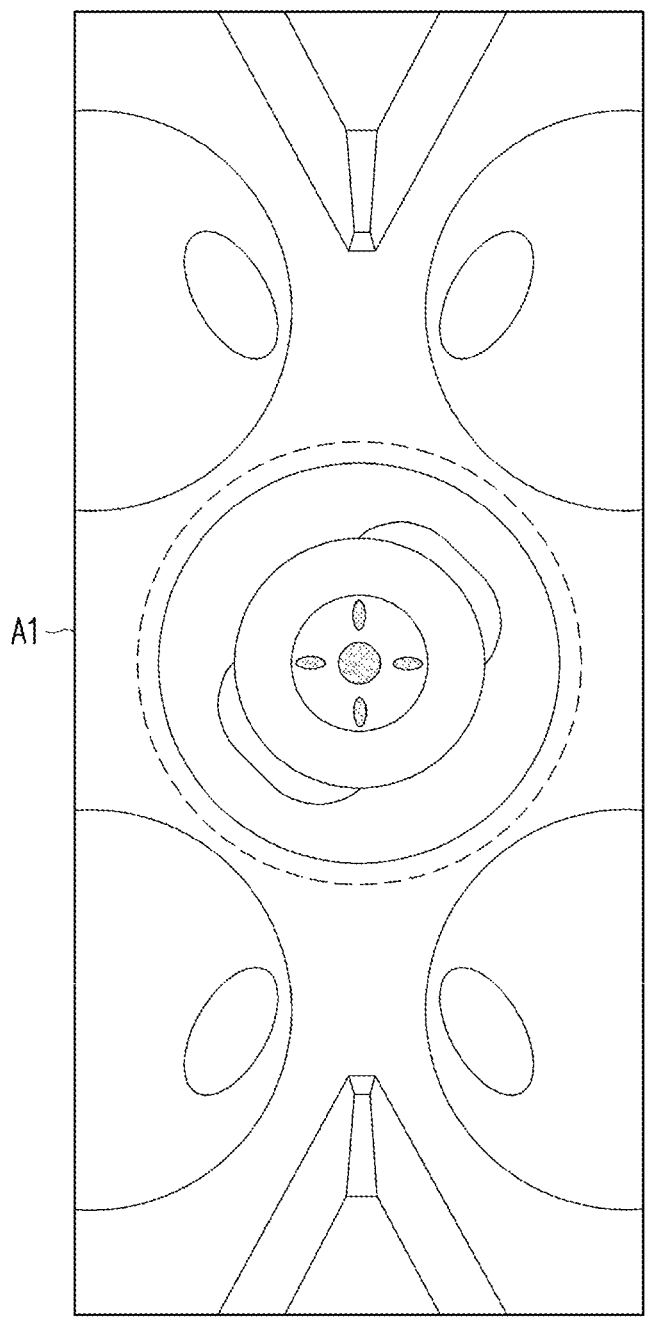
FIG. 2 is a schematic diagram of a sleep state wallpaper A1 according to an embodiment of the disclosure.
Figure 3:
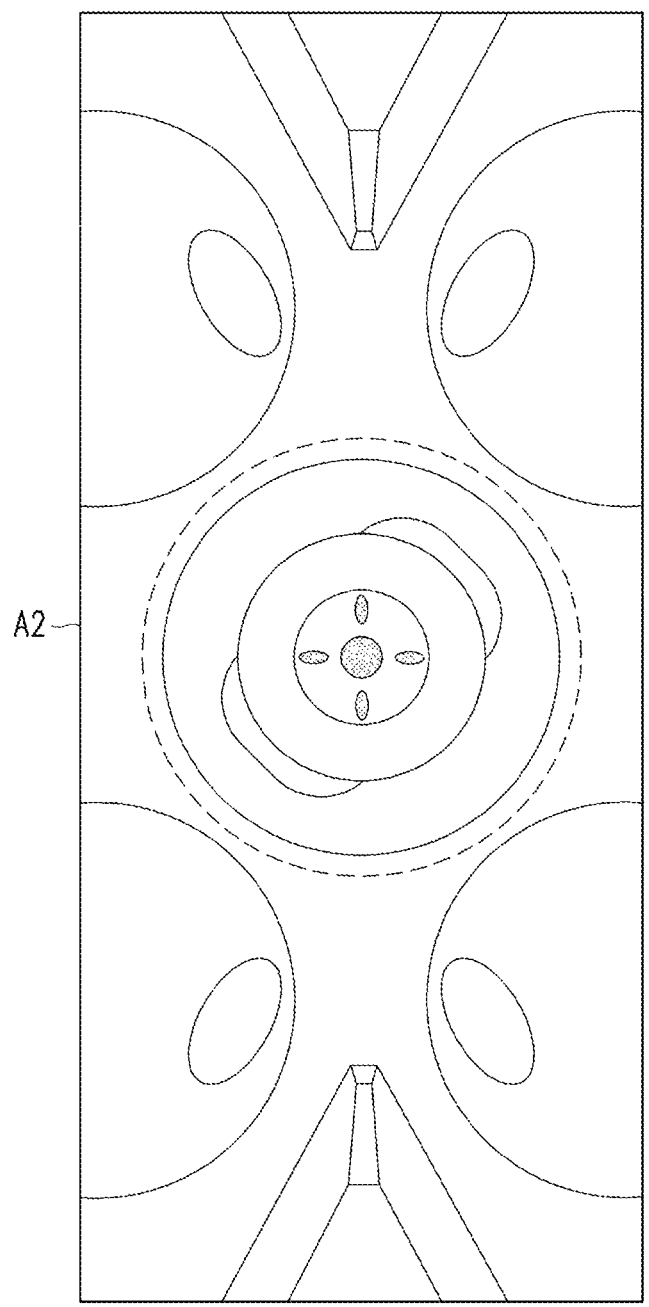
FIG. 3 is a schematic diagram of a sleep state wallpaper A2 according to an embodiment of the disclosure.
Figure 4:
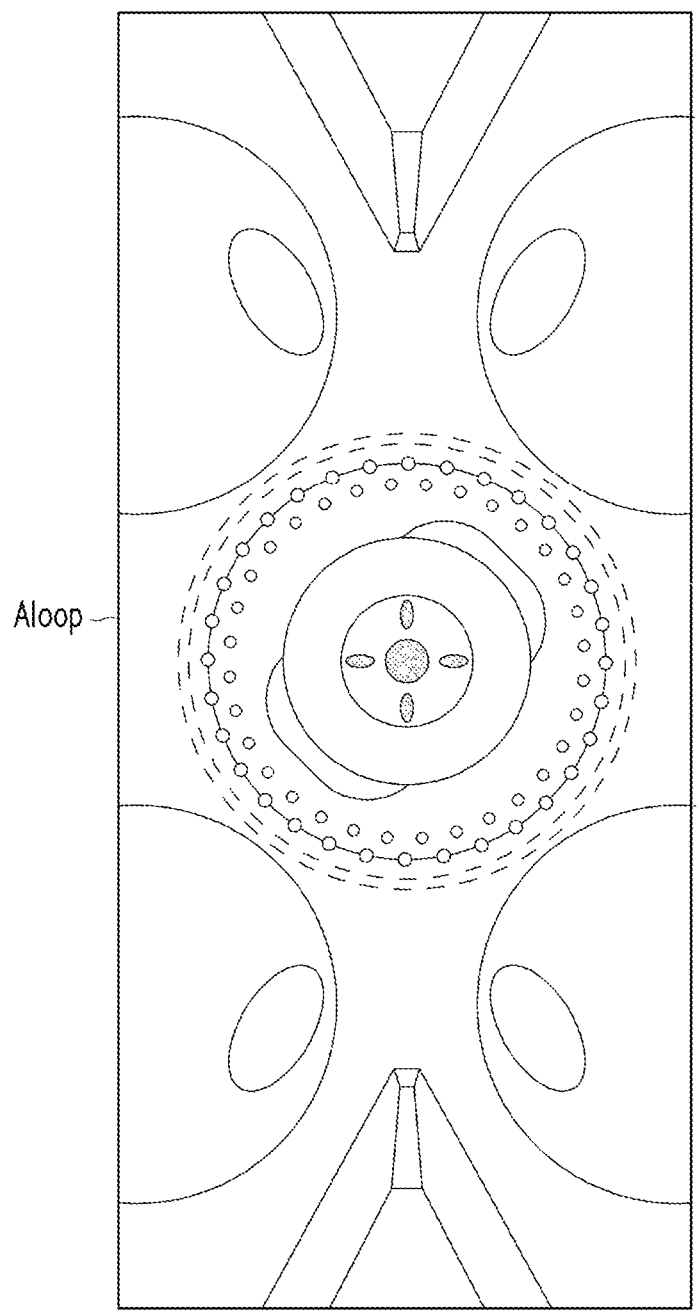
FIG. 4 is a schematic diagram of a transition image Aloop during displaying of a sleep state wallpaper A1 is switched to a sleep state wallpaper A2 according to an embodiment of the disclosure.

To make the content of the disclosure more comprehensible, embodiments are described below as examples according to which the disclosure is indeed implemented. In addition, wherever possible, components/members/steps with same reference numerals in the drawings and embodiments denote the same or similar parts.

Referring to FIG. 1, in an embodiment, an electronic device 100 is a smartphone and includes a processor 110, a storage medium 120, and a touch screen 130.

In an embodiment, the processor 110 is, a central processing unit (CPU), a micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or another similar component or a combination of the foregoing components. The processor 110 is coupled to the storage medium 120 and the touch screen 130, and accesses and executes a plurality of modules or various applications stored in the storage medium 120, to implement various functions of the electronic device 100.

In an embodiment, the storage medium 120 is, a random access memory (RAM), a read-only memory (ROM), a flash memory, a hard disk drive (HDD), a solid state drive (SSD), or similar components or a combination of the foregoing components, and the storage medium 120 is configured to store the plurality of modules or the various applications executable by the processor 110.

The touch screen 130 is a liquid-crystal display (LCD), a light-emitting diode (LED) display, a vacuum fluorescent display (VFD), a plasma display panel (PDP), an organic light-emitting diode (OLED) display, or a field-emission display (FED). The touch screen 130 has input/output functions. The processor 110 displays a user interface (UI) by the touch screen 130 to output information to a user. The user inputs information into the processor 110 by the touch screen 130.

The processor 110 changes a displayed dynamic wallpaper mode according to a mode of the electronic device 100. In this embodiment, the dynamic wallpaper mode of the electronic device 100 includes a first dynamic wallpaper mode, a second dynamic wallpaper mode, a third dynamic wallpaper mode, and a fourth dynamic wallpaper mode. Each dynamic wallpaper mode includes one or more dynamic visual effects.

The electronic device 100 includes a high-performance state and a non-high-performance state. When the electronic device 100 is in the high-performance state, the processor 110 increases computing resources. The processor 110 displays wallpapers such as a sleep state wallpaper A1, a sleep state wallpaper A2, a sleep state wallpaper A3, or a normal state wallpaper N1 by the touch screen 130. When the electronic device 100 is in the non-high-performance state, the processor 110 reduces the computing resources. The processor 110 displays wallpapers such as the sleep state wallpaper A3, a high-performance state wallpaper X1, a high-performance state wallpaper X2, or a normal state wallpaper N2 by the touch screen 130. In an embodiment, the sleep state wallpaper A1, the sleep state wallpaper A2, and the sleep state wallpaper A3 are the same, the normal state wallpaper N1 and the normal state wallpaper N2 are the same, and the high-performance state wallpaper X1 and the high-performance state wallpaper X2 are the same.

The computing resources include a processor utilization, a processor operating frequency, a graphics processing unit utilization, a memory usage amount, a screen update rate, or a touch screen sampling rate. In an embodiment, the processor 110 increases the processor utilization, the processor operating frequency, the graphics processing unit utilization, the memory usage amount, the screen update rate, or the touch screen sampling rate when the processor 110 determines to increase the computing resources. The processor 110 reduces the processor utilization, the processor operating frequency, the graphics processing unit utilization, the memory usage amount, the screen update rate, or the touch screen sampling rate when the processor 110 determines to reduce the computing resources.

In an embodiment, the electronic device 100 includes a lock screen mode and a non-lock screen mode. The processor 110 deactivates some input/output functions of the user interface when the electronic device 100 is in the lock screen mode. For example, except a specific unlocking operation, the user has no way to input any information by the touch screen 130 and the user interface displayed on the touch screen 130. The processor 110 activates all input/output functions of the user interface when the electronic device 100 is in the non-lock screen mode.

The processor 110 displays the first dynamic wallpaper mode of the dynamic wallpaper by the touch screen 130 when the electronic device 100 is in the lock screen mode. The first dynamic wallpaper mode includes a first dynamic visual effect. The processor 110 presents the first dynamic visual effect by the touch screen 130 when the electronic device 100 is in the non-high-performance state. The processor 110 displays the sleep state wallpaper A1 and the sleep state wallpaper A2 cyclically to present the first dynamic visual effect.

Figure 5:
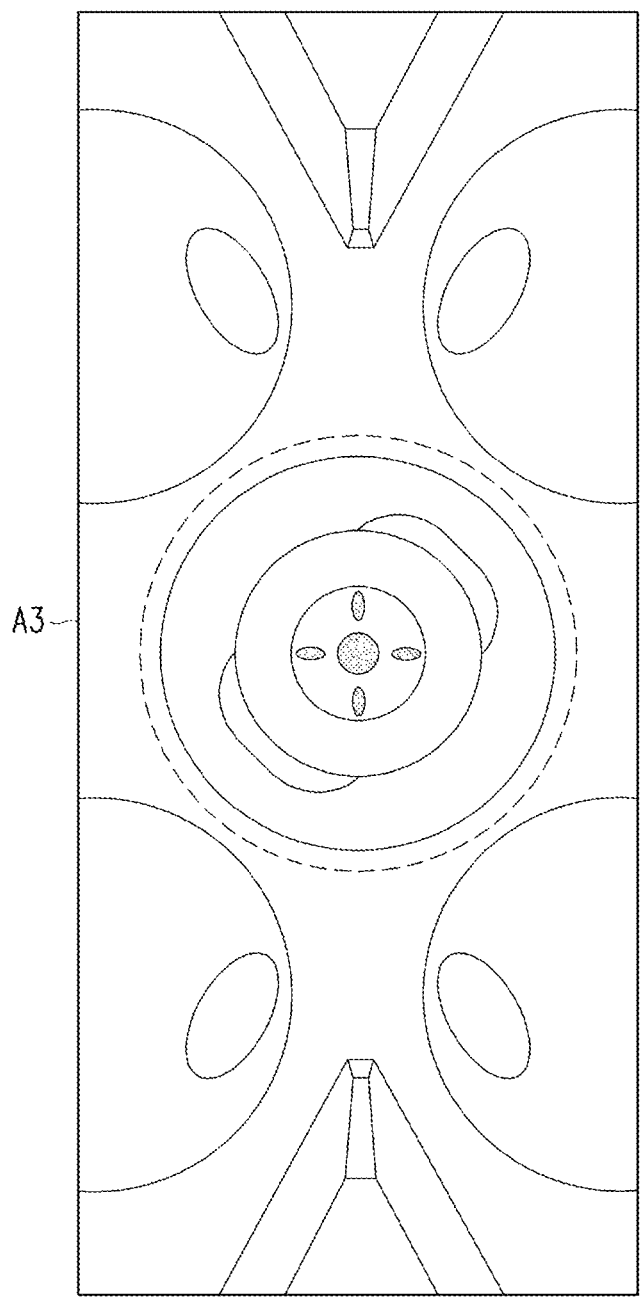
FIG. 5 is a schematic diagram of a sleep state wallpaper A3 according to an embodiment of the disclosure.
Figure 6:
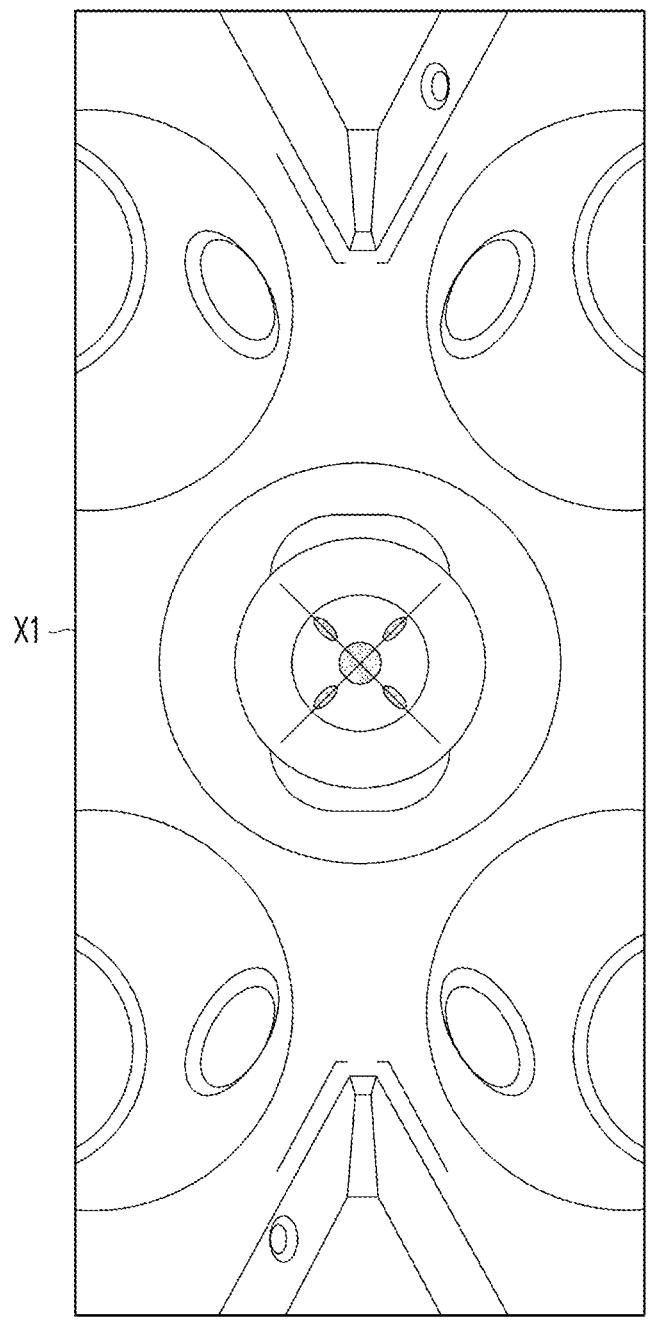
FIG. 6 is a schematic diagram of a high-performance state wallpaper X1 according to an embodiment of the disclosure.
Figure 7:
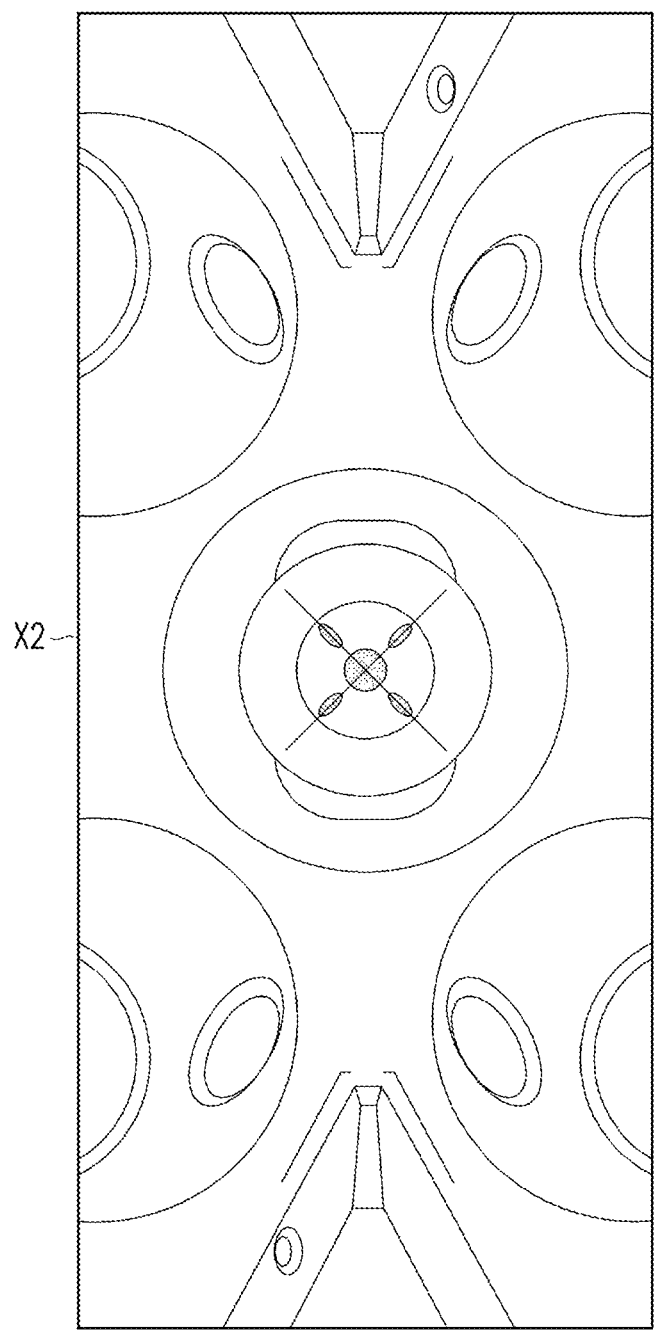
FIG. 7 is a schematic diagram of a high-performance state wallpaper X2 according to an embodiment of the disclosure.
Figure 8:
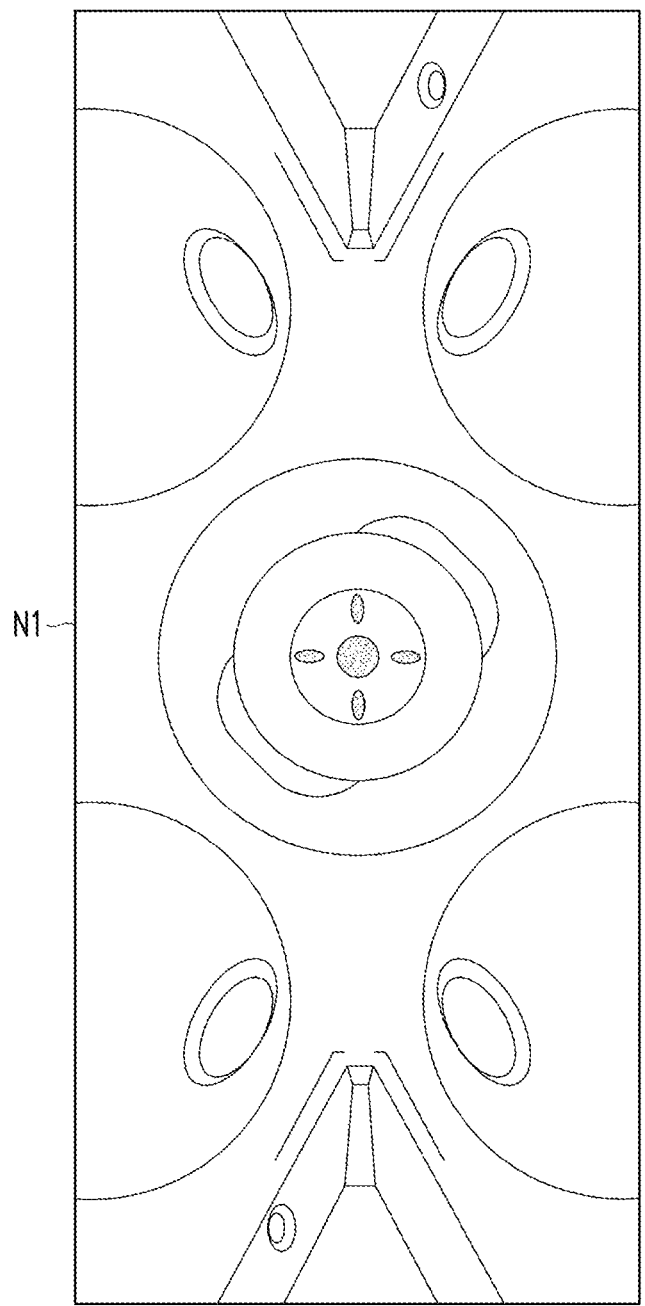
FIG. 8 is a schematic diagram of a normal state wallpaper N1 according to an embodiment of the disclosure.
Figure 9:
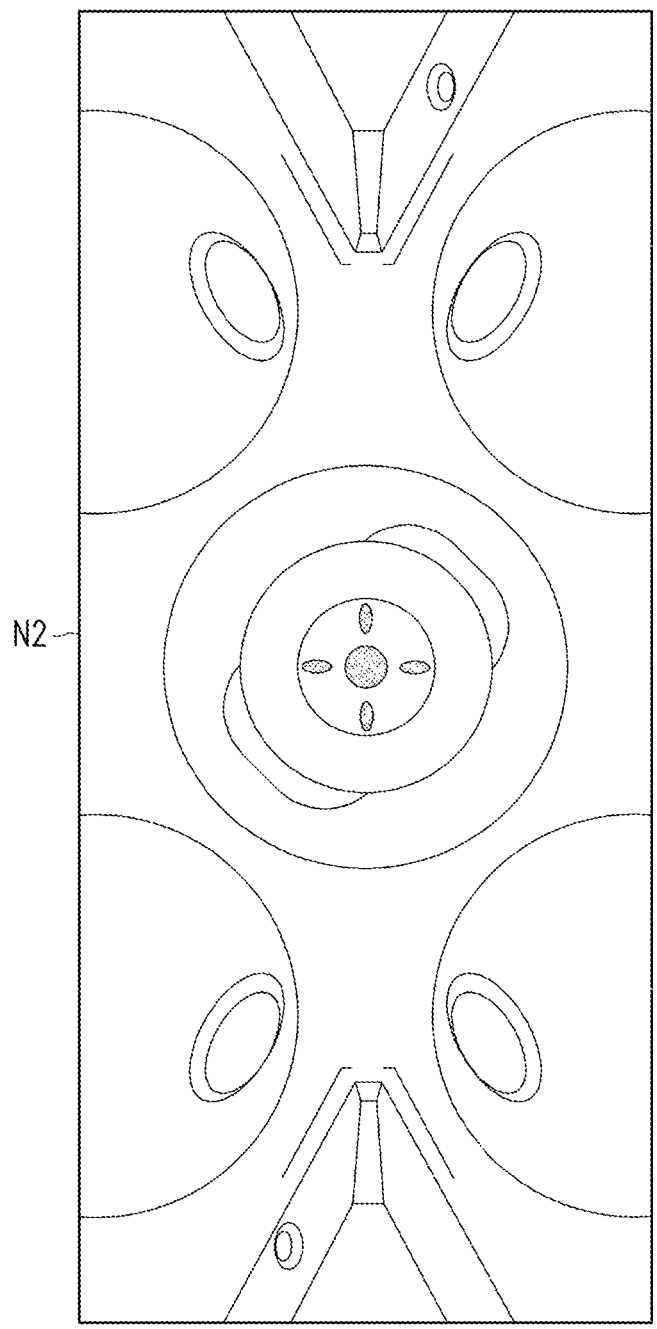
FIG. 9 is a schematic diagram of a normal state wallpaper N2 according to an embodiment of the disclosure.

In an embodiment, the processor 110 displays a transition image during displaying from one wallpaper to another wallpaper. In an embodiment, the processor 110 displays a transition image Aloop shown in FIG. 5 during displaying from the sleep state wallpaper A1 to the sleep state wallpaper A2.

The first dynamic wallpaper mode includes a second dynamic visual effect. The processor 110 presents the second dynamic visual effect by the touch screen 130 when the electronic device 100 is in the non-high-performance state and the processor 110 receives a performance switching instruction by the touch screen 130. In an embodiment, the performance switching instruction is inputted into the electronic device 100 by operating the touch screen 130. The performance switching instruction is used for switching the electronic device 100 from the non-high-performance state to the high-performance state or switching the electronic device 100 from the high-performance state to the non-high-performance state. The processor 110 sequentially displays the sleep state wallpaper A2 and the high-performance state wallpaper X1 by the touch screen 130, to present the second dynamic visual effect.

When the processor 110 is in the high-performance state and the lock screen mode, the processor 110 continuously displays the high-performance state wallpaper X1 if the processor 110 does not receive, from the touch screen 130, the performance switching instruction or an unlocking instruction for switching the electronic device 100 from the lock screen mode to the non-lock screen mode.

The first dynamic wallpaper mode includes a third dynamic visual effect. The processor 110 presents the third dynamic visual effect by the touch screen 130 when the electronic device 100 is in the high-performance state and the processor 110 receives the performance switching instruction by the touch screen 130. The processor 110 sequentially displays the high-performance state wallpaper X1, the sleep state wallpaper A3, and the sleep state wallpaper A1 by the touch screen 130, to present the third dynamic visual effect.

The processor 110 displays the second dynamic wallpaper mode of the dynamic wallpaper by the touch screen 130 when the electronic device 100 is in the non-lock screen mode. The second dynamic wallpaper mode includes a fourth dynamic visual effect. The processor 110 presents the fourth dynamic visual effect by the touch screen 130 when the electronic device 100 is in the non-high-performance state and the processor 110 receives the performance switching instruction by the touch screen 130. The processor 110 sequentially displays the normal state wallpaper N1 and the high-performance state wallpaper X2 by the touch screen 130, to present the fourth dynamic visual effect.

The second dynamic wallpaper mode includes a fifth dynamic visual effect. The processor 110 presents the fifth dynamic visual effect by the touch screen 130 when the electronic device 100 is in the high-performance state and the processor 110 receives the performance switching instruction by the touch screen 130. The processor 110 sequentially displays the high-performance state wallpaper X2, the normal state wallpaper N2, and the normal state wallpaper N1 by the touch screen 130, to present the fifth dynamic visual effect.

The processor 110 displays the third dynamic wallpaper mode of the dynamic wallpaper by the touch screen 130 when the electronic device 100 is switched from the lock screen mode to the non-lock screen mode. The third dynamic wallpaper mode includes a sixth dynamic visual effect. The processor 110 presents the sixth dynamic visual effect by the touch screen 130 when the electronic device 100 is switched from the lock screen mode to the non-lock screen mode (in an embodiment, the user inputs the unlocking instruction into the electronic device 100 by the touch screen 130) in the non-high-performance state. The processor 110 sequentially displays the sleep state wallpaper A2, the sleep state wallpaper A3, and the normal state wallpaper N1 by the touch screen 130, to present the sixth dynamic visual effect.

The third dynamic wallpaper mode includes a seventh dynamic visual effect. The processor 110 presents the seventh dynamic visual effect by the touch screen 130 when the electronic device 100 is switched from the lock screen mode to the non-lock screen mode in the high-performance state. The processor 110 sequentially displays the high-performance state wallpaper X1 and the high-performance state wallpaper X2 by the touch screen 130, to present the seventh dynamic visual effect.

The processor 110 displays the fourth dynamic wallpaper mode of the dynamic wallpaper by the touch screen 130 when the electronic device 100 is switched from the non-lock screen mode to the lock screen mode. The fourth dynamic wallpaper mode includes an eighth dynamic visual effect. The processor 110 presents the eighth dynamic visual effect by the touch screen 130 when the electronic device 100 is switched from the non-lock screen mode to the lock screen mode in the non-high-performance state. The processor 110 sequentially displays the normal state wallpaper N1 and the sleep state wallpaper A1 by the touch screen 130, to present the eighth dynamic visual effect.

The fourth dynamic wallpaper mode includes a ninth dynamic visual effect. The processor 110 presents the ninth dynamic visual effect by the touch screen 130 when the electronic device 100 is switched from the non-lock screen mode to the lock screen mode in the high-performance state. The processor 110 sequentially displays the high-performance state wallpaper X2 and the high-performance state wallpaper X1 by the touch screen 130, to present the ninth dynamic visual effect.

Figure 10:
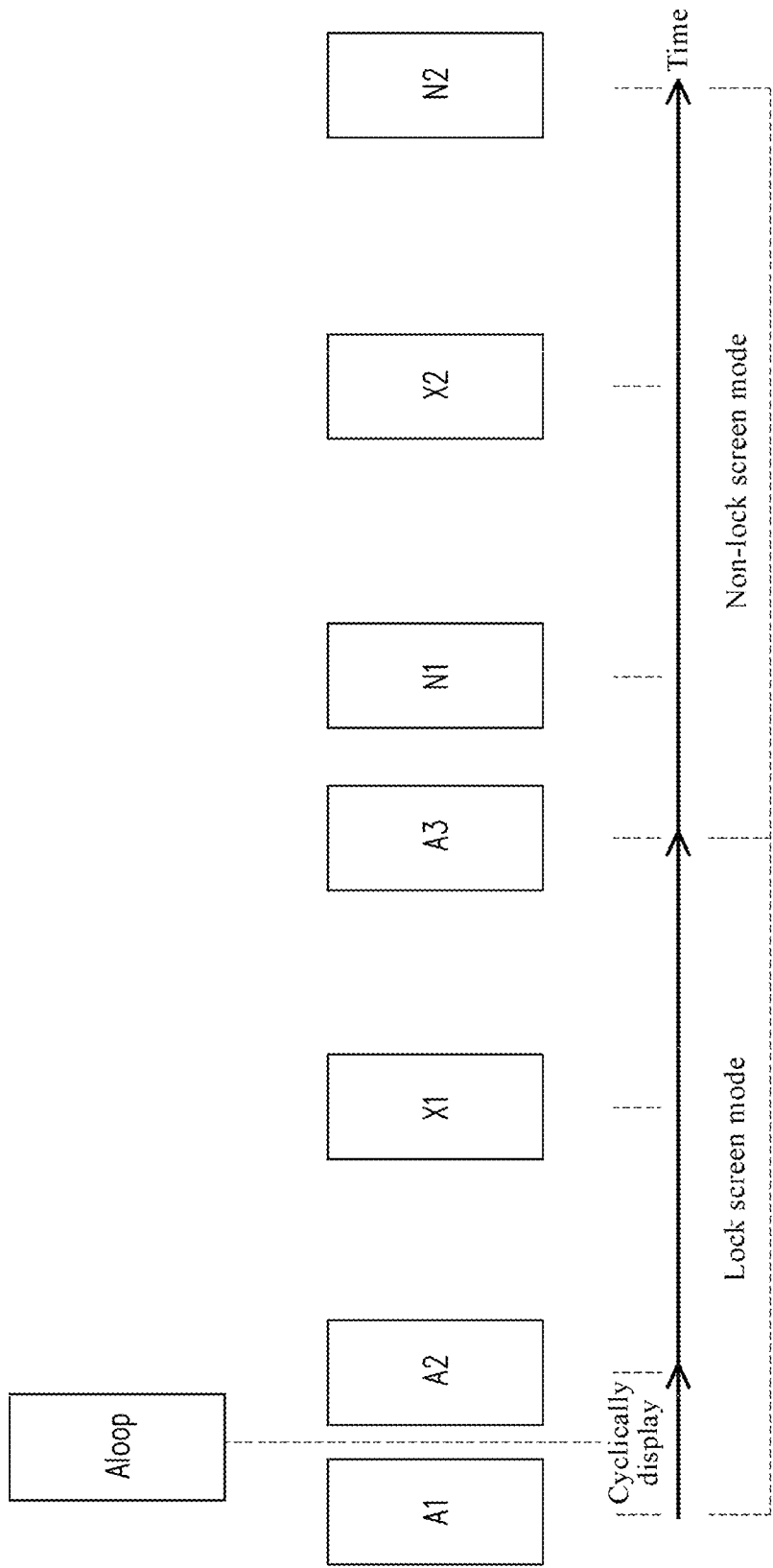
FIG. 10 is a sequence diagram of wallpapers displayed on an operated electronic device according to an embodiment of the disclosure.

FIG. 10 shows an example in which the electronic device 100 displays the dynamic wallpaper. First, in the lock screen mode and the non-high-performance state, the electronic device 100 displays the sleep state wallpaper A1 and the sleep state wallpaper A2 cyclically, to present the first dynamic visual effect. In addition, the transition image Aloop is displayed during displaying from the sleep state wallpaper A1 to the sleep state wallpaper A2. The electronic device 100 sequentially displays the sleep state wallpaper A2 and the high-performance state wallpaper X1 when receiving the performance switching instruction to be switched from the non-high-performance state to the high-performance state, to present the second dynamic visual effect.

The electronic device 100 sequentially displays the high-performance state wallpaper X1, the sleep state wallpaper A3, and the sleep state wallpaper A1 when the electronic device 100 receives the performance switching instruction to be switched from the high-performance state to the non-high-performance state, to present the third dynamic visual effect.

In the lock screen mode and the non-high-performance state, the electronic device 100 displays the sleep state wallpaper A1 and the sleep state wallpaper A2 cyclically. The electronic device 100 sequentially displays the sleep state wallpaper A2, the sleep state wallpaper A3, and the normal state wallpaper N1 when the electronic device 100 receives the unlocking instruction to be switched from the lock screen mode to the non-lock screen mode, to present the sixth dynamic visual effect.

Then, in the non-lock screen mode and the non-high-performance state, the electronic device 100 sequentially displays the normal state wallpaper N1 and the high-performance state wallpaper X2 when the electronic device 100 receives the performance switching instruction to be switched from the non-high-performance state to the high-performance state, to present the fourth dynamic visual effect.

In the non-lock screen mode and the high-performance state, the electronic device 100 sequentially displays the high-performance state wallpaper X2, the normal state wallpaper N2, and the normal state wallpaper N1 when the electronic device 100 receives the performance switching instruction to be switched from the high-performance state to the non-high-performance state, to present the fifth dynamic visual effect.

Based on the above, the electronic device of the disclosure determines a dynamic wallpaper mode according to the lock screen state or the performance state. When the electronic device is switched to a high-performance state to greatly improve the performance, the electronic device improves the user's visual experience by switching the dynamic wallpaper mode of the dynamic wallpaper, thereby enhancing the sense of immersion of the user when the performance is improved. In addition, a display rule of the dynamic wallpaper of the disclosure is applied to different mobile phone products. Manufacturers quickly complete development of the mobile phone products having a dynamic wallpaper display function only by adjusting a visual effect of the dynamic wallpaper.

What is claimed is:

1. An electronic device, comprising:
a touch screen providing a user interface; and
a processor coupled to the touch screen, wherein the processor displays a first dynamic wallpaper mode by the touch screen when determining that the electronic device is in a lock screen mode, wherein the first dynamic wallpaper mode comprises a first dynamic visual effect and a second dynamic visual effect different from the first dynamic visual effect, wherein the first dynamic visual effect is that the touch screen displays a first sleep state wallpaper and a second sleep state wall paper cyclically, wherein the processor presents the first dynamic visual effect by the touch screen when the processor is in a non-high-performance state and presents the second dynamic visual effect by the touch screen when the processor is in a high-performance state and receives a first performance switching instruction for switching from the high-performance state to the non-high-performance state, wherein an amount of computing resources consumed by the processor in the non-high-performance state and the lock screen mode is less than an amount of computing resources consumed by the processor in the high-performance state and the lock screen mode, wherein the processor deactivates at least one input or output function of the user interface in the lock screen mode.

2. The electronic device according to claim 1, wherein the first dynamic wallpaper mode further comprises a third dynamic visual effect, and the processor presents the third dynamic visual effect by the touch screen when the processor is in the non-high-performance state and receives a second performance switching instruction.

3. The electronic device according to claim 2, wherein the third dynamic visual effect is that the touch screen sequentially displays the second sleep state wallpaper and a first high-performance state wallpaper.

4. The electronic device according to claim 1, wherein the second dynamic visual effect is that the touch screen sequentially displays a first high-performance state wallpaper, a third sleep state wallpaper, and the first sleep state wallpaper.

5. The electronic device according to claim 1, wherein the processor displays a second dynamic wallpaper mode by the touch screen when determining that the electronic device is in a non-lock screen mode.

6. The electronic device according to claim 5, wherein the second dynamic wallpaper mode comprises a fourth dynamic visual effect, and the processor presents the fourth dynamic visual effect by using the touch screen when the processor is in the non-high-performance state and receives a second performance switching instruction.

7. The electronic device according to claim 6, wherein the fourth dynamic visual effect is that the touch screen sequentially displays a first normal state wallpaper and a second high-performance state wallpaper.

8. The electronic device according to claim 5, wherein the second dynamic wallpaper mode comprises a fifth dynamic visual effect, and the processor presents the fifth dynamic visual effect by the touch screen when the processor is in the high-performance state and receives a second performance switching instruction.

9. The electronic device according to claim 8, wherein the fifth dynamic visual effect is that the touch screen sequentially displays a second high-performance state wallpaper, a second normal state wallpaper, and a first normal state wallpaper.

10. The electronic device according to claim 1, wherein the processor displays a third dynamic wallpaper mode by the touch screen when the electronic device is switched from the lock screen mode to a non-lock screen mode.

11. The electronic device according to claim 10, wherein the third dynamic wallpaper mode comprises a sixth dynamic visual effect, and the processor presents the sixth dynamic visual effect by the touch screen when the processor is in the non-high-performance state and the electronic device is switched from the lock screen mode to the non-lock screen mode.

12. The electronic device according to claim 11, wherein the sixth dynamic visual effect is that the touch screen sequentially displays the second sleep state wallpaper, a third sleep state wallpaper, and a first normal state wallpaper.

13. The electronic device according to claim 10, wherein the third dynamic wallpaper mode comprises a seventh dynamic visual effect, and the processor presents the seventh dynamic visual effect by the touch screen when the processor is in the high-performance state and the electronic device is switched from the lock screen mode to the non-lock screen mode.

14. The electronic device according to claim 13, wherein the seventh dynamic visual effect is that the touch screen sequentially displays a first high-performance state wallpaper and a second high-performance state wallpaper.

15. The electronic device according to claim 1, wherein the processor displays a fourth dynamic wallpaper mode by the touch screen when the electronic device is switched from the non-lock screen mode to the lock screen mode.

16. The electronic device according to claim 15, wherein the fourth dynamic wallpaper mode comprises an eighth dynamic visual effect, and the processor presents the eighth dynamic visual effect by the touch screen when the processor is in the non-high-performance state and the electronic device is switched from the non-lock screen mode to the lock screen mode.

17. The electronic device according to claim 16, wherein the eighth dynamic visual effect is that the touch screen sequentially displays a first normal state wallpaper and the first sleep state wallpaper.

18. The electronic device according to claim 15, wherein the fourth dynamic wallpaper mode comprises a ninth dynamic visual effect, and the processor presents the ninth dynamic visual effect by the touch screen when the processor is in the high-performance state and the electronic device is switched from the non-lock screen mode to the lock screen mode.

19. The electronic device according to claim 18, wherein the ninth dynamic visual effect is that the touch screen sequentially displays a second high-performance state wallpaper and a first high-performance state wallpaper.

\* \* \* \* \*